(12) United States Patent
Seifert

(10) Patent No.: US 8,493,656 B2
(45) Date of Patent: Jul. 23, 2013

(54) OBJECTIVE CHANGER AND A MICROSCOPE

(75) Inventor: Roland Seifert, Heidelberg (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 625 days.

(21) Appl. No.: 12/675,835

(22) PCT Filed: Sep. 5, 2008

(86) PCT No.: PCT/EP2008/061788
§ 371 (c)(1),
(2), (4) Date: Mar. 1, 2010

(87) PCT Pub. No.: WO2009/030757
PCT Pub. Date: Mar. 12, 2009

(65) Prior Publication Data
US 2010/0309546 A1 Dec. 9, 2010

(30) Foreign Application Priority Data

Sep. 6, 2007 (DE) .......................... 10 2007 042 260

(51) Int. Cl.
*G02B 21/00* (2006.01)
(52) U.S. Cl.
USPC .......................................................... 359/381

(58) Field of Classification Search
USPC .................................................. 359/368, 381
See application file for complete search history.

(56) References Cited

U.S. PATENT DOCUMENTS

| 6,437,911 | B1 * | 8/2002 | Hasegawa | 359/381 |
| 2002/0001126 | A1 * | 1/2002 | Engelhardt | 359/380 |
| 2002/0036822 | A1 * | 3/2002 | Karaki et al. | 359/368 |
| 2005/0190438 | A1 | 9/2005 | Karaki et al. | |

FOREIGN PATENT DOCUMENTS

| DE | 10031720 A1 | 1/2002 |
| DE | 102005040834 A1 | 3/2007 |
| EP | 1063347 A1 | 12/2000 |
| JP | 2006337643 A | 12/2006 |

OTHER PUBLICATIONS

International Search Report mailed Nov. 25, 2008 which issued during the prosecution of corresponding International Patent Application No. PCT/EP2008/061788.

* cited by examiner

*Primary Examiner* — Alessandro Amari
(74) *Attorney, Agent, or Firm* — Leydig, Voit & Mayer, Ltd.

(57) ABSTRACT

An objective changer for a microscope includes a changing device configured to pendulously swing each of a plurality of objectives into a respective operating position near a focal position.

12 Claims, 9 Drawing Sheets

OBJECTIVE CHANGER AND A MICROSCOPE

CROSS REFERENCE TO RELATED APPLICATIONS

This application is a U.S. National Phase application under 35 U.S.C. §371 of International Application No. PCT/EP2008/061788, filed Sep. 5, 2008, and claims benefit to German patent application DE 10 2007 042 260.3, filed Sep. 6, 2007. The International Application was published in German on Mar. 12, 2009 as WO 2009/030757 A1 under PCT Article 21 (2).

FIELD

The invention relates to an objective changer for a microscope having a changing device for at least two objectives. Further, the present invention relates to a microscope having such an objective changer.

BACKGROUND

Objective changers for a microscope are available in different embodiments. For example, from the document DE 100 31 720 A1, an objective changer is described in which individual objectives can be transferred from an objective stock along a guide rail into their desired position. For this, stops for a safe positioning of the objective are provided in the desired position. Alternatively, an objective change can be performed along a mechanical curve element.

Further, it is described to provide objective changers with a turret mechanism in which individual objectives are arranged substantially along a circular line and can be rotated into their operating position along this circular line. Further, objective changers are described which implement an objective change via a combination of sequentially performed movements, namely via a lifting, a shifting and a subsequent lowering of an objective into its operating position. In doing so, the user has to turn and pull or, respectively, press a lever.

In particular for applications in the field of electrophysiology it is necessary that a sample table having a sample placed thereon is no longer moved after its positioning. On the one hand, this is because of the often existing basic touch sensitivity of the samples to be examined and, on the other hand, because of the fact that biological samples mostly require free access to the sample to allow well-directed manipulations on the sample during its examination.

Altogether it can be said that the objective changers described in the related art are, on the one hand, very expensively and elaborately structured and, on the other hand, do not allow "fixed stage" applications with a fixed sample table. In the case of objective changers, the sample table often has to be moved for changing an objective.

SUMMARY

In an embodiment, the present invention provides an objective changer for a microscope, the objective changer having a changing device configured to pendulously swing each of a plurality of objectives into a respective operating position near a focal position.

BRIEF DESCRIPTION OF THE DRAWINGS

The invention is elaborated upon below making reference to embodiments. The accompanying figures show the following.

DETAILED DESCRIPTION

Figure 1:
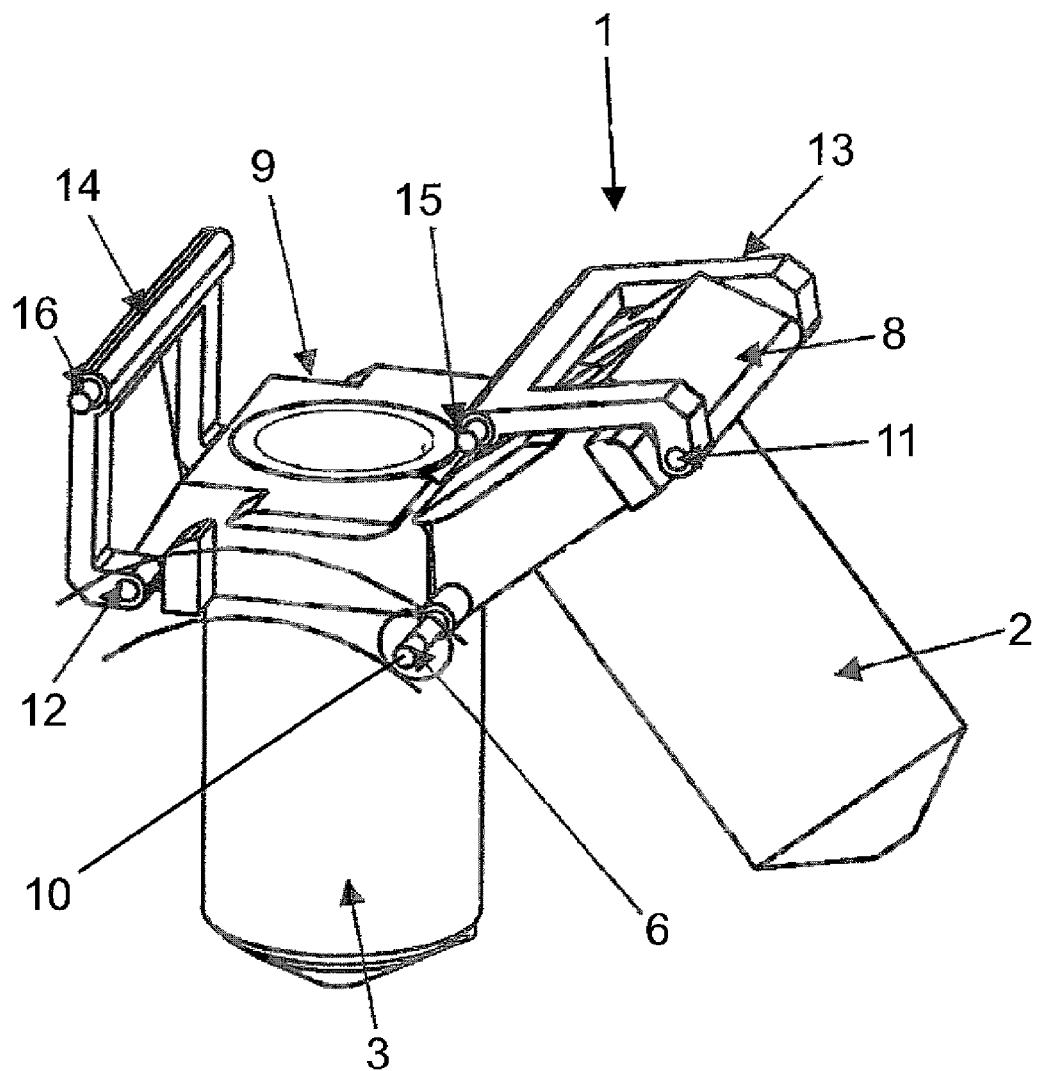
FIG. 1 shows in a perspective schematic illustration an embodiment of an objective changer according to the invention.
Figure 2:
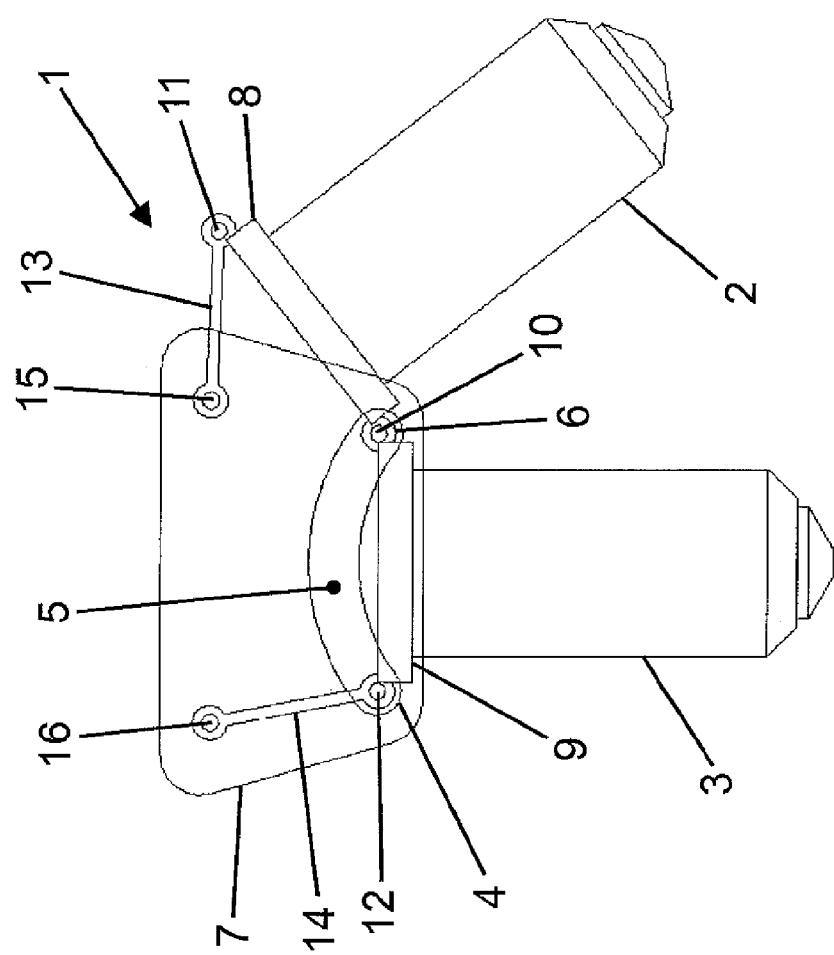
FIGS. 2 to 6 show in schematic side views snapshots of the objective changer during the change from one objective to another objective.
Figure 3:
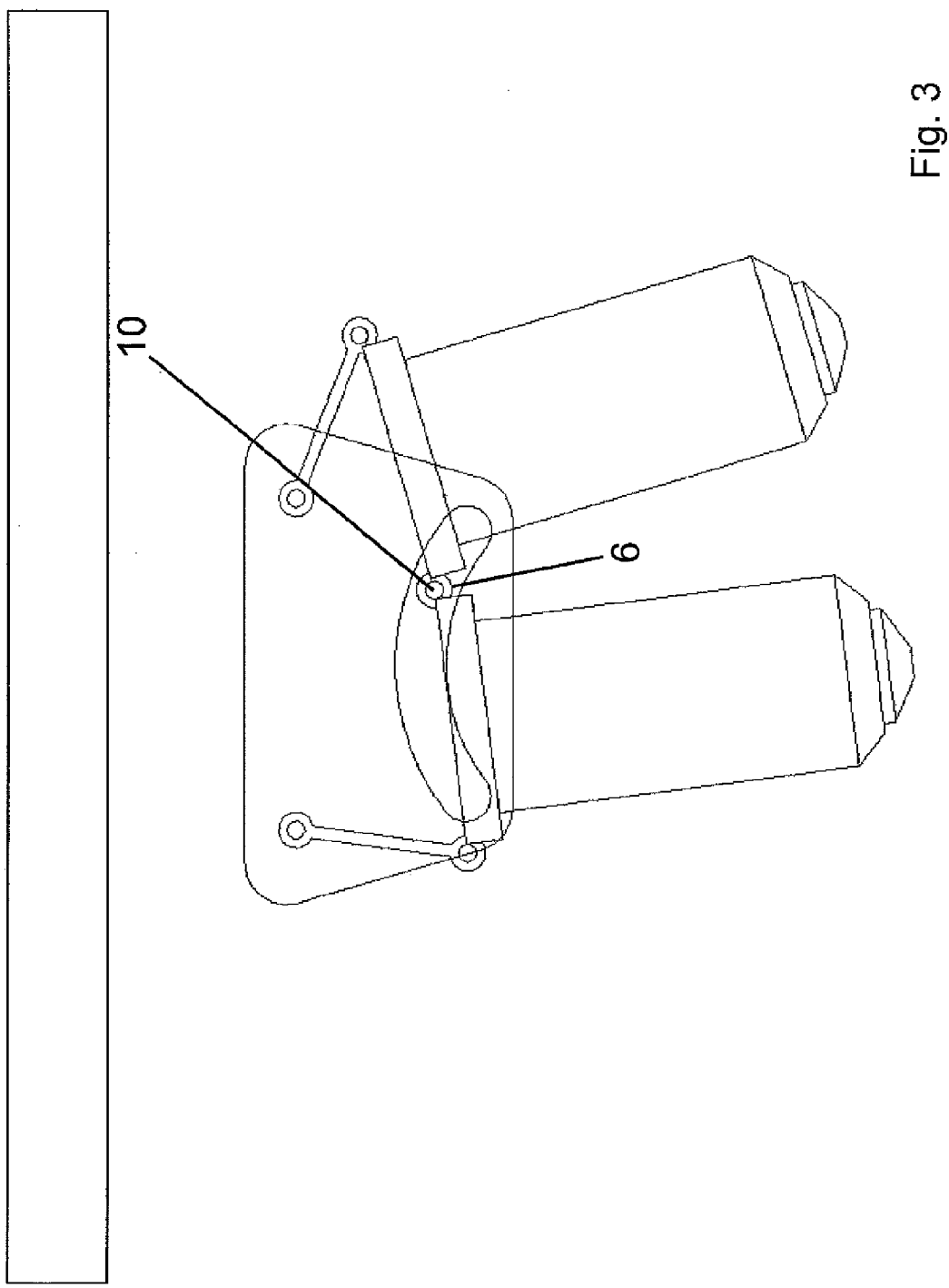
Figure 4:
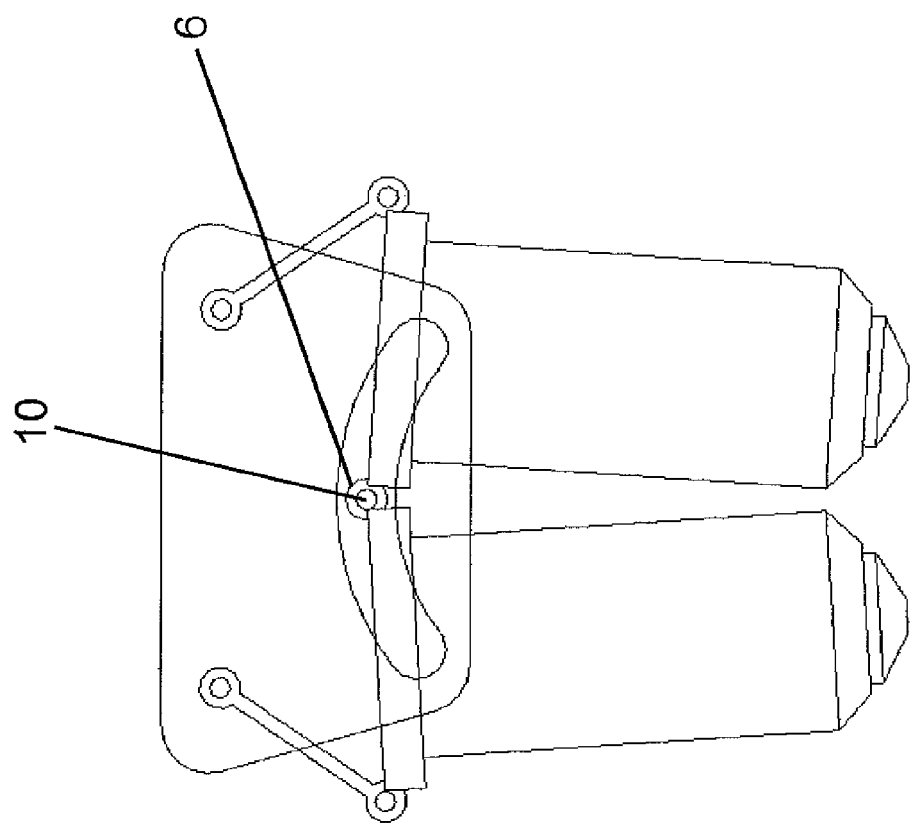
Figure 5:
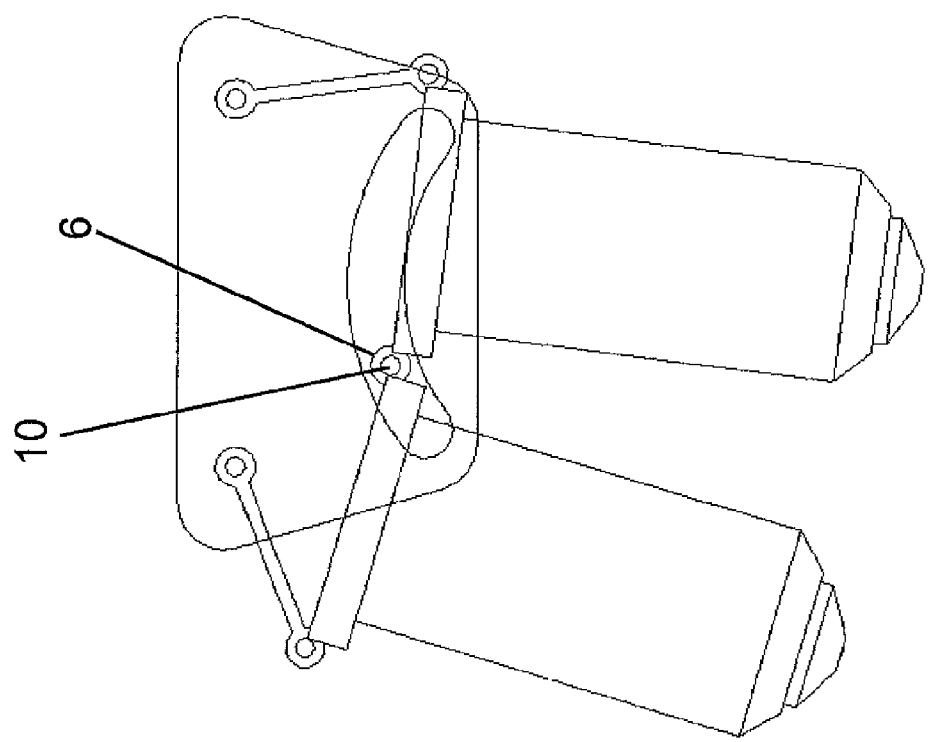
Figure 6:
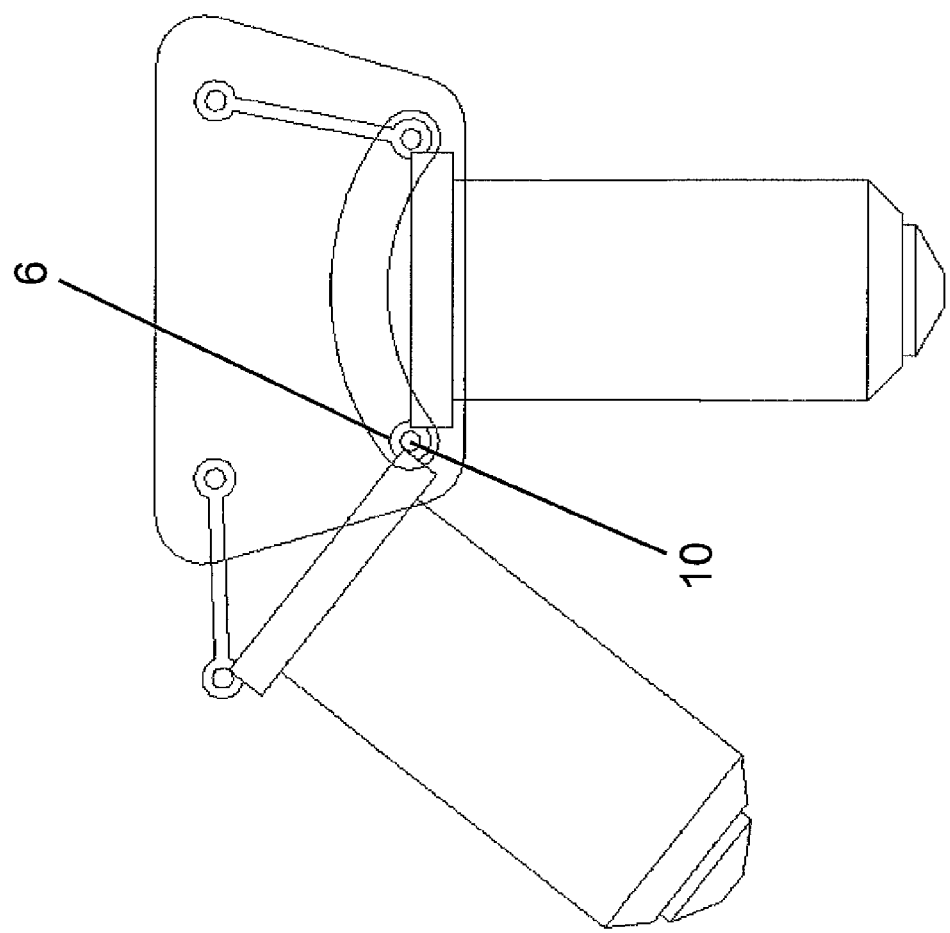

In an embodiment, the present invention provides an objective changer as well as a microscope having an easy objective change, with little space requirements for the objective change.

The objective changer is designed and developed such that each of the objectives can be pendulously swung into its operating position near the focal position via the changing device.

According to the invention, a suitable swinging mechanism is provided for swinging the objectives into their operating position. Specifically, each of the objectives can be pendulously swung into its operating position near the focal position via the changing device. By the inventive pendulous swinging motion, on the one hand, a very simple mode of motion for the objectives is chosen and, on the other hand, an objective change with a space requirement as little as possible is implemented.

Therefore, with the inventive objective changer an objective changer is specified in which an easy objective change with little space requirements for the objective change is made possible with constructively simple means.

In a further advantageous manner, each of the objectives could be pendulously swung from the operating position into a standby position via the changing device. In this case, a swinging of the non-used objective into the free space, for example, to the front or the rear, is possible. In this connection, the objectives could be coupled to the changing device such that their pendulous swinging motion is performed in one common plane. As a result thereof, a particularly space-saving objective change is implemented, and there remains a wide spatial area for handling and manipulating the sample.

For achieving a particularly effective pendulous swinging motion, the objectives could be coupled such that a swinging-in of the one objective causes the swinging-out of the other objective or the other objectives. As a result thereof, a particularly easy change of the objectives from, for example, an objective having a low magnifying power to an objective having a high magnifying power is made possible.

With respect to a particularly safe objective change, during which a particularly high degree of safety with respect to the desired integrity of a sample is achieved, the objectives could additionally be lowered during the pendulous swinging-in motion and additionally be lifted during the pendulous swinging-out motion via the changing device. Specifically, the changing device could be designed such that the objective changing motion starts by lifting the objective to be swung out and ends by lowering a swung-in objective. In other words, as a result thereof, a coupled motion composed of a swinging operation and a lifting or, respectively, lowering operation could be performed. Impairment of the sample or of any manipulators of the sample is thus lessened.

With respect to a particularly simple construction of the objective changer, the changing device could have a link-type guide device with a mechanism coupled thereto for implementing the pendulous swinging motion of the objectives. In a further advantageous manner, the lowering and lifting motion of the objectives could be implemented via this mechanism. Insofar, one single mechanism could provide both the pendulous swinging motion and the lowering and lifting motion of the objectives.

With respect to a compact structure of the objective changer, the objectives could be coupled to the mechanism. Further component parts would not be necessary in this connection. Such a coupling of the objectives to the mechanism could be implemented in a particularly easy manner via a screw connection or a bayonet coupling. As a result thereof, an easy replacement also of a great number of objectives using the available mechanism or, respectively, changing device is possible.

In a specific simple design, the link-type guide device could have a curved slot for guiding an actuating element of the mechanism. As a result thereof, a particularly easy operation and actuation of the objective changer and hence of the changing device is made possible, namely by merely guiding the actuating element in the slot. In doing so, the guiding of the actuating element to one end of the slot could effect the swinging-in and possibly the lowering of an objective and the guiding of the actuating element to the other end of the slot could effect the swinging-in and possibly the lowering of the other objective. Merely by swinging the actuating element back and forth along the curved slot, thus the pendulous swinging of the objectives into and out of their operating position is achieved.

In a constructively further particularly easy manner, the slot could be formed in a plate or side plate or in a system carrier of the objective changer. The mechanism could be arranged in a protected and safe manner between two plates or side plates arranged in parallel to one another. The plates or side plates could be fixed relative to one another in the sense of a frame. As a result thereof, specifically an arrangement of two plates or side plates arranged in parallel could be implemented with the mechanism for the objectives arranged in-between.

Further, with respect to a particularly simple design of the objective changer, the actuating element could be formed as an axle or lever. Such an axle or such a lever can be easily inserted in the slot of a guide device and be used therein as an actuating element.

In a specific design of the changing device, the objectives could be pivoted on the actuating element. As a result thereof, a direct mounting of the objectives on the actuating element is ensured.

In a specific design, each of the objectives could be arranged on a holder of the mechanism, and the holders could be pivoted with one of their ends on the actuating element. In other words, in this case the objectives would be pivoted on the actuating element via a holder. The objectives could be fixedly mounted on the holder. By pivoting or articulating the objectives or the holders on the actuating element, a pivoting or articulating about a common axle could be realized. Here, the actuating element itself could serve as a common axle, when formed as an axle or lever.

In a further constructively simple manner, the respective other end of each of the holders could be mounted or articulated on one lever each—connecting lever—of the mechanism such that it can be pivoted about a pivotable axle. Thus, the holders are pivotally mounted or articulated with their one end on the actuating element and with their other end on the connecting lever.

The connecting levers could in turn be pivoted with their end facing away from the respective holder about one axle each, which axles are stationary relative to the changing device. The stationary axles could specifically be mounted in the plates or side plates or in the system carrier. As a result thereof, a particularly compact structure of the changing device and hence of the objective changer is achieved.

The common axle, the pivotable axles and the stationary axles could be arranged in parallel to one another. As a result thereof, a particularly easy maneuverability of the changing device via the actuating element is achieved.

Basically two objectives could be coupled to the changing device in order to ensure a change between the two objectives. In an even more comfortable design of the changing device, three objectives could be coupled to the changing device so that by pivoting the actuating element each time one of the three objectives can be pivoted into its operating position. In this connection, a right-hand stop position, an intermediate position and a left-hand stop position could each correlate with the operating positions of the three objectives.

For providing more than two or three objectives by means of the changing device, an additional feed device could also be provided which couples individual objectives to the changing device and thus makes a swinging-in of the desired objective into its operating position possible.

With respect to a particularly safe arrangement of an objective in its operating position, the changing device could have an adjusting device for adjusting the position of at least one pivotable axle in axial direction. By means of such an adjusting device a positioning and adjusting of the objective in the direction of the pivotable axle could thus be carried out.

In a constructively particularly simple manner, the adjusting device could have a spring-biased deflection plate which can be pressed against the pivotable axle preferably by means of a screw against the spring biasing direction. In a further simple manner, the deflection plate could be embedded in a side plate or plate of the changing device in which the stationary axles are mounted. As a result thereof, a particularly compact design of the changing device and hence of the objective changer is achieved.

For implementing an adjustment of the objective in the so-called Z-direction of a microscope or with respect to a tilting of the objectives, the changing device could have a setting device for changing the curvature of the slot. By changing the curvature of the slot, the actuating element inevitably experiences a change of its quasi-circular path which it runs through when it is actuated or pivoted. In particular, the end regions of the slot could be variable with respect to their curvature so that finally a change in the end position of the actuating element and hence a change in the end position of the objective in the operating position of the objective could be achieved.

In a specific and simple manner, the setting device could have a clamping element, preferably a screw, with which an elastically pivotable end region of the slot can be pivoted.

In an embodiment, the present invention provides a microscope having an objective changer of the above-described type. With respect thereto and to avoid repetitions reference is made to the above-described advantages and embodiments concerning the objective changer.

With the inventive objective changer, a simple objective change with little space requirements for the objective change is made possible with constructively simple means. In order to actuate the changing device, it is finally sufficient to throw an actuating element. The objectives can be changed in focused position without contacting the sample.

The changing device could also be referred to as a crank drive. The lifting and lowering of the objective and hence the distance of the objectives from the sample is determined by the length ratios of the component parts of the mechanism or, respectively, the changing device or the crank drive as well as by the circular path which is run through by the actuating element in the slot. Specifically, the length ratios of the holders and connecting levers are of particular importance here. Thus, the objective can be lifted away from the sample and pivoted backward or forward into the free space.

The above-mentioned connecting levers could also be referred to as a crank.

FIG. 1 shows in a perspective and schematic illustration an embodiment of an inventive objective changer for a microscope. The objective changer has a changing device 1 for at least two objectives 2, 3. With respect to an easy objective change with little space requirements for the objective change, each of the objectives 2, 3 can be pendulously swung into its operating position near the focal position via the changing device 1.

Further, each of the objectives 2, 3 can be pendulously swung from the operating position into a standby position via the changing device 1. In the embodiment shown in FIG. 1, the objective 2 is located in a swung-out standby position and the objective 3 is located in its operating position near the focal position.

The objectives 2 and 3 are coupled to the changing device 1 such that their pendulous swinging motion is performed in one common plane. This results in little space requirements for the changing operation. Further, the objectives 2 and 3 are coupled such that a swinging-in of the one objective 2 or 3 causes the swinging-out of the other objective 3 or 2.

Via the changing device 1, the objectives 2, 3 can additionally be lowered during the pendulous swinging-in motion and can additionally be lifted during the pendulous swinging-out motion. This guarantees an objective change without contacting the sample lying underneath.

FIGS. 2 to 6 show in schematic side views snapshots of the objective changer during the change from one objective 3 to the other objective 2. Here, the movements performed by all mechanisms of the changing device 1 are well visible.

The changing device 1 has a link-type guide device 4 with a mechanism coupled thereto for implementing the pendulous swinging motion of the objectives 2 and 3. Via the mechanism, additionally the lowering and lifting motion of the objectives 2 and 3 is implemented. The objectives 2 and 3 are coupled to the mechanism.

Specifically, the link-type guide device 4 has a curved slot 5 for guiding an actuating element 6 of the mechanism. The actuating element 6 is formed as a pivot lever. The slot 5 is formed in a side plate 7.

The objectives 2 and 3 are each arranged on a holder 8 and 9, respectively, of the mechanism, the holders 8 and 9 being pivoted with one of their ends on the actuating element 6. Specifically, the objectives 2 and 3 are mounted via the holders 8 and 9 on the actuating element 6 so as to be pivotable about a common axle 10.

With their respective other ends, the holders 8 and 9 are each mounted or articulated on one lever each—connecting levers 13 and 14—of the mechanism such that they can be pivoted about a respective pivotable axle 11 and 12. On their end facing away from the respective holder 8, 9, the connecting levers 13 and 14 are in turn pivoted about an axle 15 and 16, respectively, which axles are stationary relative to the changing device 1. Due to the pivotable mounting of the holders 8 and 9 via the connecting levers 13 and 14, the pendulous swinging motion of the objectives 2 and 3 is achieved. Here, the common axle 10, the pivotable axles 11 and 12 and the stationary axles 15 and 16 are arranged in parallel. During the pendulous swinging motion, these axles 10 and 11 and 12 are merely shifted relative to the stationary axles 15 and 16.

Figure 7:
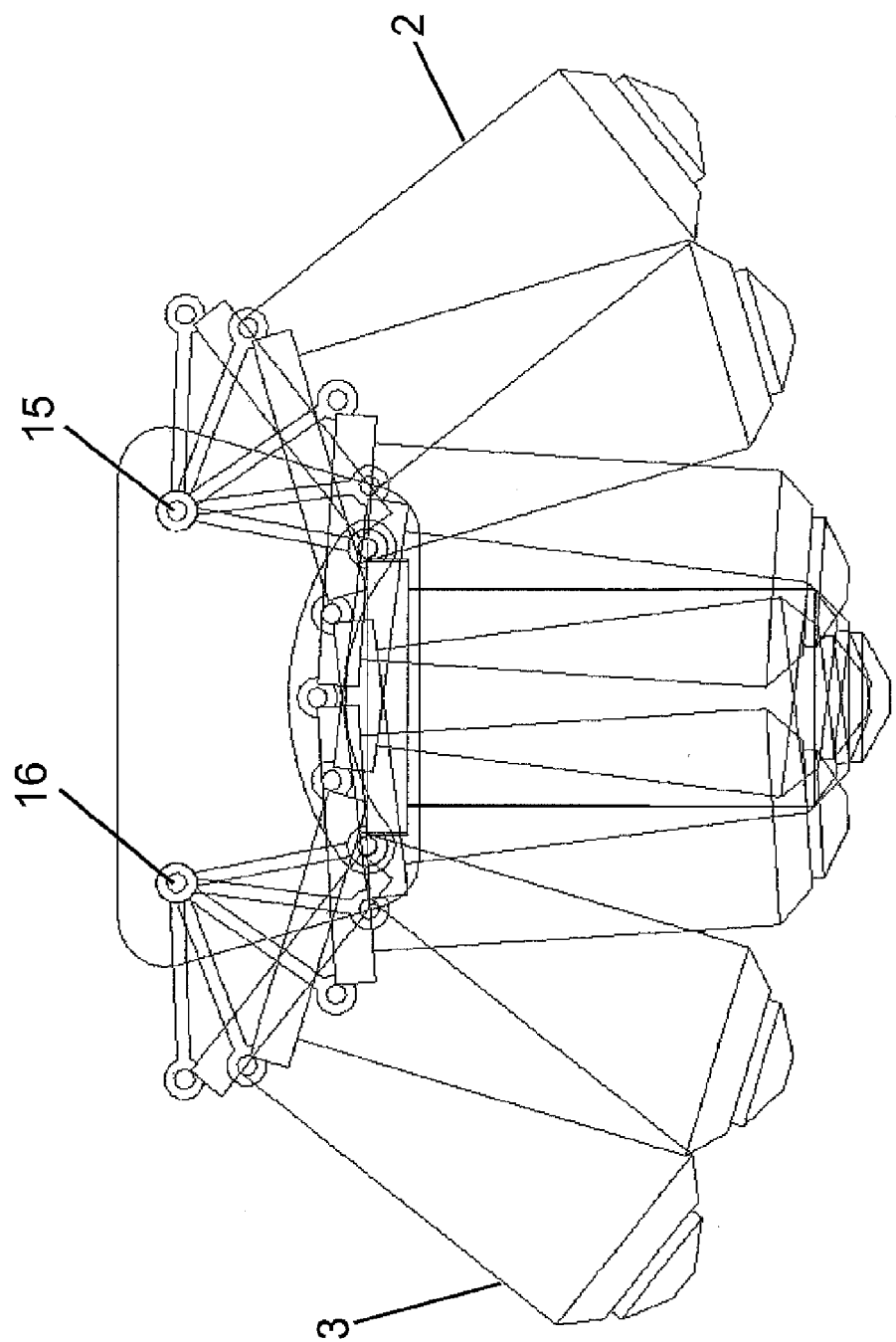
FIG. 7 shows in a schematic side view all snapshots of FIGS. 2 to 6 in a superimposed manner.

FIG. 7 shows in a schematic side view all snapshots of the FIGS. 2 to 6 in a superimposed manner. Here, a complete swinging motion for changing the objectives 2 and 3 is visible.

Figure 8:
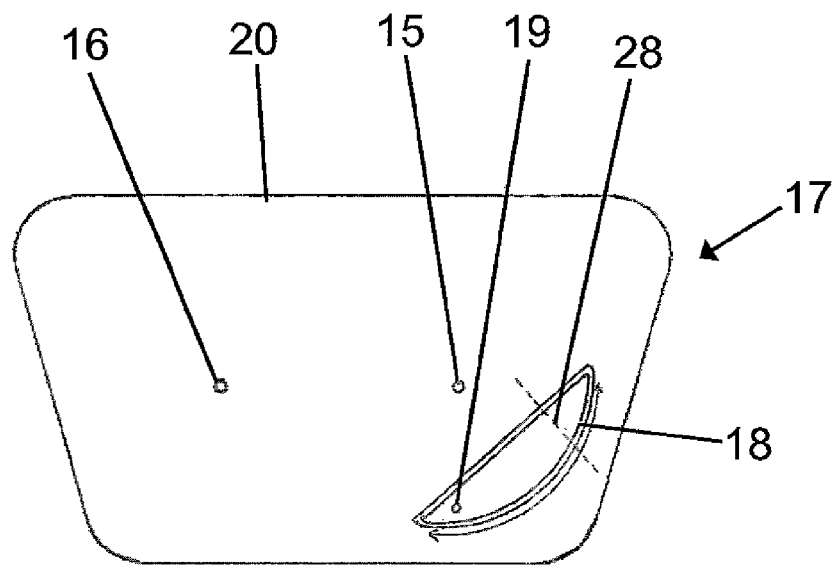
FIG. 8 shows in a schematic side view a side plate with integrated adjusting device.

FIG. 8 shows in a schematic side view a side plate 20 in which the stationary axles 15 and 16 are mounted. The side plate 20 has an integrated adjusting device 17 for the position of at least one pivotable axle 11 or 12 in axial direction. For reasons of simplicity, only one adjusting device 17 is shown in the illustration, however a further adjusting device 17 for the other pivotable axle 11 or 12 can also be integrated in the side plate 20.

The adjusting device 17 has a spring-biased deflection plate 18 which can be pressed against the pivotable axle 11 or 12 preferably by means of a screw 19 against the spring biasing direction. By pressing the deflection plate 18 against the axle 11 or 12, this axle can be displaced in axial direction, as a result whereof an adjustment of the associated objective relative to the optical axis of a microscope results. The deflection plate 18 is embedded in the side plate 20. The side plate 20 is arranged opposite to the side plate 7 shown in FIGS. 2 to 7, wherein the mechanism of the changing device 1 for the objectives 2 and 3 is arranged between the side plates 7 and 20.

During the pendulous swinging motion of the changing device 1 the pivotable axle 11 or 12 to be adjusted moves along the deflection plate 18, as indicated by the double arrow in FIG. 8. Insofar, the pressure effect exerted by the deflection plate 18 only acts in the lower region of the swinging motion of the pivotable axles 11 or 12 and hence only when the objective 2 or 3 is substantially arranged in the operating position. The broken line 28 indicates the pivot axis about which the deflection plate 18 can be slightly pivoted in order to be pressed against the axle 11 or 12.

Figure 9:
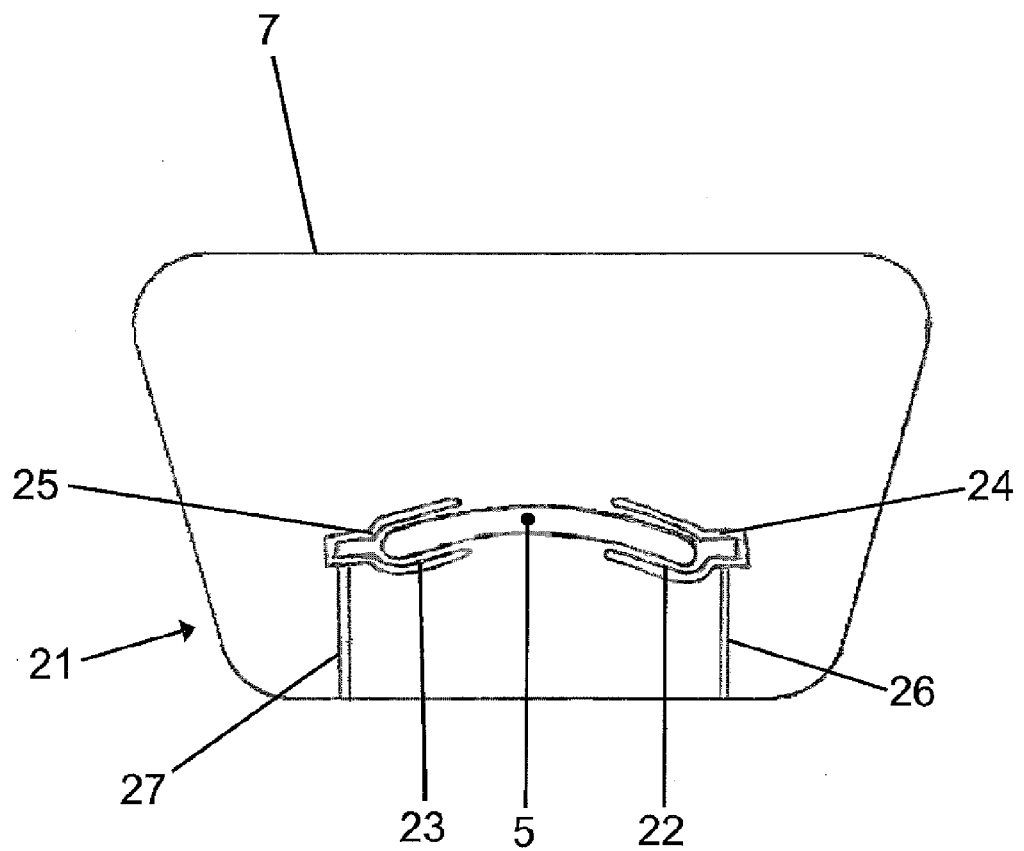
FIG. 9 shows in a schematic and enlarged side view a side plate which has an integrated adjusting device and can be arranged opposite to the side plate from FIG. 8.

FIG. 9 shows in a schematic side view a side plate 7 lying opposite to the side plate 20 from FIG. 8 and having an integrated setting device 21 for changing the curvature of the slot 5. In the embodiment shown in FIG. 9, the end regions 22 and 23 of the slot 5 are formed slightly movably or bendably. This is achieved by continuous recesses 24 and 25 or passages in the side plate 7. Insofar, the end regions 22 and 23 in the side plate 7 are designed in a quasi-uncovered manner. For moving or setting the end regions 22 and 23, the side plate 7 has threads 26 and 27 into each of which one screw can be inserted. These screws can be screwed against the ends of the uncovered end regions 22 and 23 so that these end regions 22 and 23 can be bent or pivoted in screwing direction. This changes the shape of the slot 5 and hence the guiding for an actuating element 6 during the pendulous changing movement for the objectives 2 and 3. Insofar, a setting of the operating position of the objectives 2 and 3 in Z-direction or a tilting of the objectives 2 and 3 is made possible.

With respect to further advantageous designs and developments of the inventive teaching reference is made, on the one hand, to the general part of the description and, on the other hand, to the enclosed claims for avoiding repetitions.

Finally, it is most particularly pointed out that the above merely arbitrarily chosen embodiments only serve to explain the teaching according to the invention but do not restrict the same to these embodiments.

While the invention has been particularly shown and described with reference to preferred embodiments thereof, it will be understood by those skilled in the art that various changes in form and details may be made therein without departing from the spirit and scope of the invention.

List of Reference Signs
1 changing device
2 objective
3 objective
4 guide device
5 slot
6 actuating element
7 side plate
8 holder
9 holder
10 common axle
11 pivotable axle
12 pivotable axle
13 connecting lever
14 connecting lever
15 stationary axle
16 stationary axle
17 adjusting device
18 deflection plate
19 screw
20 side plate
21 setting device
22 end region
23 end region
24 recess
25 recess
26 thread
27 thread
28 broken line

The invention claimed is:

1. An objective changer for a microscope, the objective changer comprising a changing device configured to pendulously swing each of a plurality of objectives into a respective operating position near a focal position, the changing device including:
   a link-type guide device including a curved slot;
   a mechanism coupled to the link-type guide device and configured to provide the pendulous swinging; and
   a setting device configured to change a curvature of the slot.

2. The objective changer according to claim 1, wherein the objective changer is further configured to pendulously swing each of the objectives from the respective operating position thereof into a standby position.

3. The objective changer according to claim 1, wherein the objectives are coupled to the changing device such that the changing device is configured to pendulously swing each objective in a common plane.

4. The objective changer according to claim 1, wherein the objectives are coupled such that swinging a first objective of the objectives into the respective operating position thereof causes a second objective of the objectives to swing out of the respective operating position thereof.

5. The objective changer according to claim 1, wherein:
   the objective changer is configured to lower each of the objectives during the pendulous swinging; and
   the objective changer is configured to lift each of the objectives during a pendulous swinging of the respective operating position.

6. The objective changer according to claim 1, wherein the mechanism is configured to lower and to lift the objectives.

7. The objective changer according to claim 1, wherein the objectives are coupled to the mechanism.

8. The objective changer according to claim 1, wherein the plurality of objectives includes at least three objectives.

9. An objective changer for a microscope, the objective changer comprising a changing device configured to pendulously swing each of at least three objectives into a respective operating position near a focal position, the changing device including:
   at least one pivotable axle; and
   an adjusting device configured to adjust a position of the at least one pivotable axle in an axial direction.

10. The objective changer according to claim 9, wherein the adjusting device includes a spring-biased deflection plate configured to be pressed against the spring biasing direction against the pivotable axle.

11. The objective changer according to claim 10, wherein:
   the changing device includes a side plate, and the deflection plate is embedded in the side plate, and further comprising stationary axles disposed on the changing device.

12. An objective changer for a microscope, the objective changer comprising a changing device configured to pendulously swing each of a plurality of objectives into a respective operating position near a focal position and to pendulously swing each of the objectives from the respective operating position thereof into a standby position, and wherein the objectives are coupled to the changing device such that the changing device is configured to pendulously swing each objective in a common plane,
   the changing device comprising:
   a link-type guide device;
   a mechanism coupled to the link-type guide device configured to provide the pendulous swinging, wherein the link-type guide device includes a curved slot configured to guide an actuating element of the mechanism, and wherein the actuating element includes at least one of an axle and a lever; and
   a holder for each objective, wherein an end of each respective holder is disposed on the actuating element so as to pivot about a common axle, and wherein a respective other end of each holder is disposed on a connecting lever of the mechanism, such that each holder can be pivoted about a pivotable axle,
   wherein ends of the connecting levers facing away from the respective holder are pivotable about a respective axle that is stationary relative to the changing device, and
   wherein the common axle, the pivotable axles and the stationary axles are parallel with respect to one another.

* * * * *